Feb. 7, 1961     D. H. SLOAN     2,971,122
HIGH-POWER MAGNETRON
Filed June 23, 1958     5 Sheets-Sheet 2
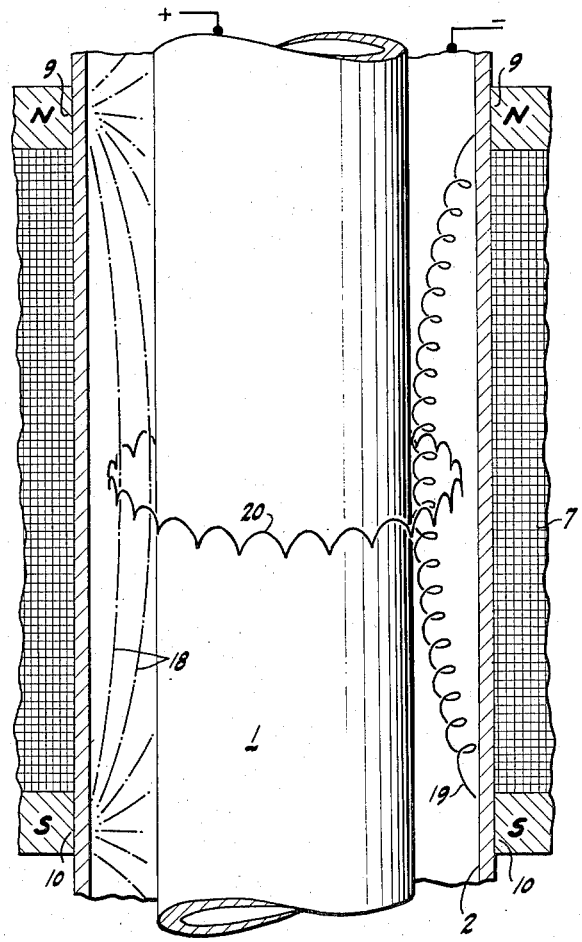
FIG·3
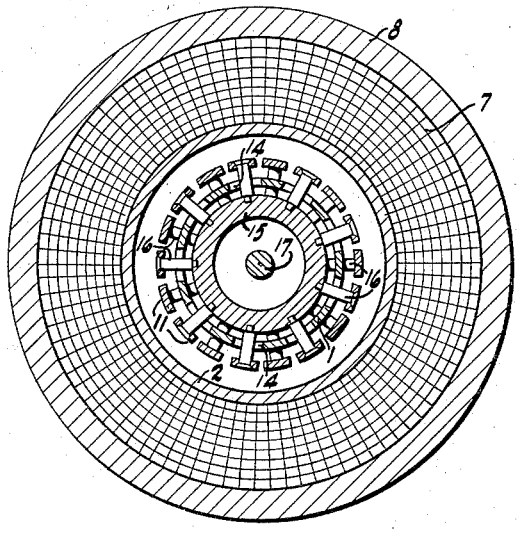
FIG·2
INVENTOR.
DAVID H. SLOAN
BY
Lippincott, Smith & Ralls
ATTORNEYS

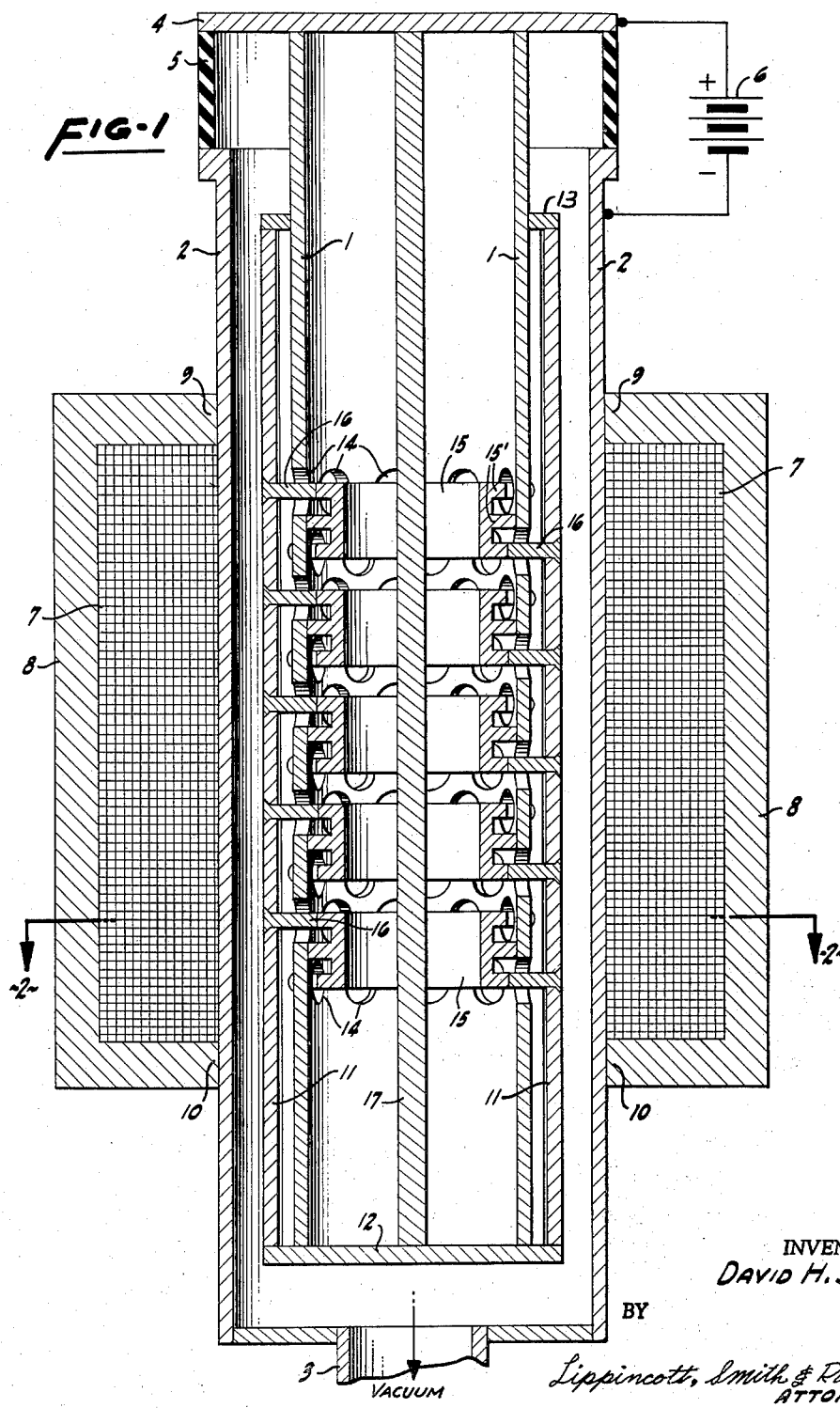

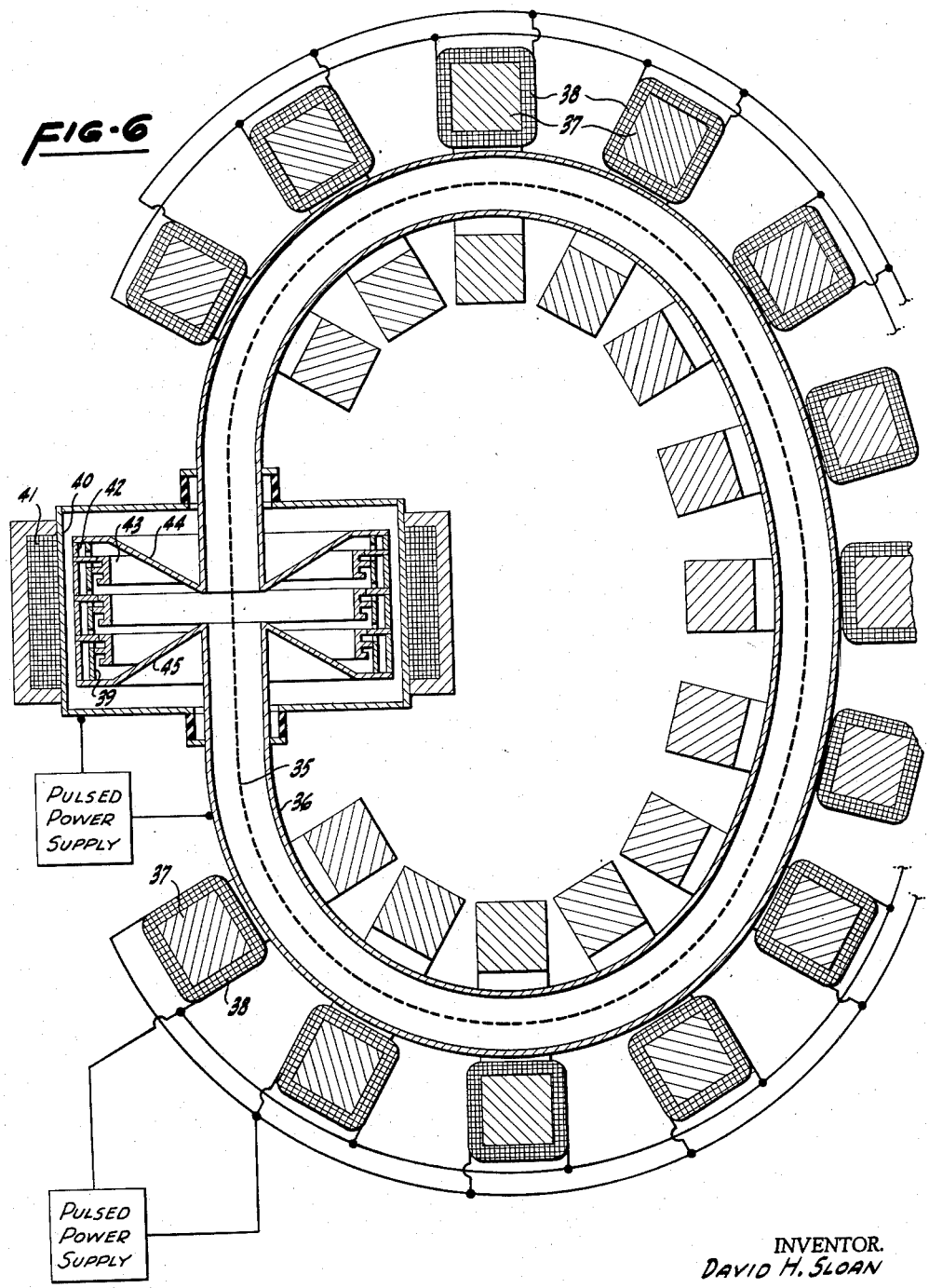

United States Patent Office 2,971,122
Patented Feb. 7, 1961

2,971,122

HIGH-POWER MAGNETRON

David H. Sloan, Berkeley, Calif., assignor to The Regents of the University of California, Berkeley, Calif., a corporation of California Filed June 23, 1958, Ser. No. 743,791

8 Claims. (Cl. 315—39.71)

This invention relates to improvements in high-power, magnetron oscillators for generating very large amounts of radio-frequency power.

In the design of high-power, electron-tube oscillators, such as large magnetrons, an upper limit to the output power that can be attained is set by limits on the voltage and current that the tube can sustain without arcing between the electrodes. A principal object of this invention is to increase the power level, beyond the maximum heretofore attainable, by inhibiting such arcing. Other objects and advantages will appear as the description proceeds.

It has been found that arcing between two electrodes is strongly inhibited by a magnetic field perpendicular to the electric field between the electrodes. Every magnetron inherently has this type of protection against arc-formation in the main, or magnetron, discharge region; such protection is provided, accidentally, in consequence of other design considerations. In conventional magnetrons, however, this protection does not extend throughout the fringing fields surrounding the discharge region: there are places where electrons and ions can traverse substantially identical paths in opposite directions—following magnetic flux lines—to establish an arc.

According to the present invention, conscious advantage is taken of the protection against arc-formation provided by the magnetic field, and this protection is extended into the fringing regions by shaping the electrodes and the magnet structure to provide gradual transitions in the electric and magnetic field patterns through the fringing regions. This makes possible operation of the improved magnetrons, without arcing, at voltage and current levels and gas pressures that would surely have produced an arc had the tube been constructed according to prior practice. As a result, magnetrons capable of generating heretofore unattainable amounts of radio-frequency power can be constructed. For example, 600 amperes of anode current have already been realized, at voltages of 20 to 40 kilovolts.

The foregoing and other aspects of this invention may be better understood from the following detailed description and the accompanying drawings. In the drawings:

Fig. 1 is a somewhat schematic, lengthwise section of a high-power magnetron embodying principles of this invention;

Fig. 2 is a transverse section taken along the line 2—2 of Fig. 1;

Fig. 3 is a greatly simplified, fragmentary schematic of the same magnetron, illustrating typical electron paths and magnetic field patterns;

Fig. 6 is a simplified schematic section of still another modification for heating plasmas.

Figure 4:
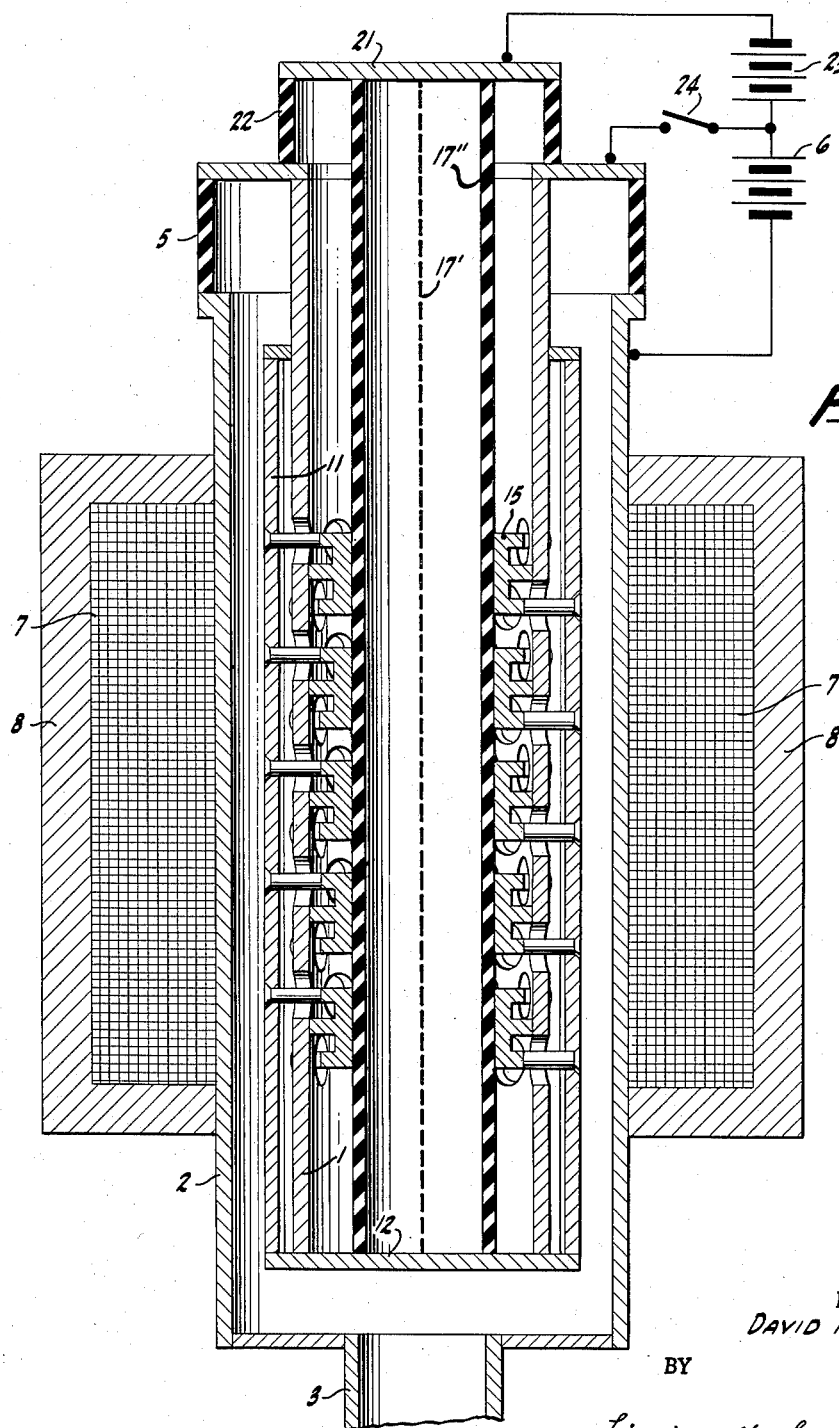
Fig. 4 is a simplified, schematic section of a modification for heating magnetically confined plasmas to tremendously high temperatures.

With reference to Figs. 1 and 2, a magnetron oscillator, of the cold-cathode type, comprises a hollow, anode cylinder 1 coaxial with and within a hollow, cylindrical cathode 2. Preferably, the cathode 2 is of a material, such as aluminum with a surface film of aluminum oxide, that has a fairly high efficiency for secondary electron emission. By way of example, cathode 2 may be a length of aluminum pipe eight inches in inside diameter, and anode cylinder 1 may be of copper and may be about six inches in outside diameter. The cylindrical anode and cathode electrodes define therebetween a cylindrical space which is evacuated—for example, by connection 3 to a continuously operated vacuum pump. A very low pressure of oxygen can be permitted, to sustain the aluminum oxide film for rich secondary emission, without encouraging arc breakdown, because of the special shape of the fringing fields, as herein described. The anode is supported by a disc 4 resting upon an annular insulator 5 that extends up from the top of cathode 2. By way of example, insulator 5 may be made of Pyrex glass. Voltage is supplied between the anode and the cathode in the usual manner, by connections to any appropriate voltage source 6. This provides, throughout the major portion of the electrode structure, a substantially uniform radial electric field between the cylindrical anode and the cylindrical cathode.

A cylindrical magnet winding 7 is disposed coaxial with and around the outside of cathode 2, as shown. Extending around the magnet winding there is a magnet shell 8, of ferromagnetic material such as transformer steel, forming an electromagnet having two circular magnetic poles 9 and 10 at opposite ends thereof, as shown. The two circular magnetic poles extend around and adjacent to the outside of cathode 2, and provide, in the region between the two magnetic poles, a magnetic field extending substantially lengthwise in the cylindrical space between anode 1 and cathode 2. Thus, crossed electric and magnetic fields of the type needed for magnetron operation are provided within a central cylindrical portion of the electrode structure.

As is well known, electrons may follow cycloidal paths in crossed electric and magnetic fields, and may interact with electromagnetic waves transmitted on a suitable slow-wave structure for producing sustained oscillations. In the magnetron illustrated in Figs. 1 and 2, a slow-wave structure is provided by a plurality of parallel, conductive bars 11 of copper or the like, disposed in a cylindrical configuration within the space between anode 1 and cathode 2, as shown, and connected to the anode in the manner hereinafter described. At their lower end, as viewed in Fig. 1, the bars 11 may be connected to a conductive disc 12 which closes the lower end of hollow cylindrical anode 1, and at their upper ends bars 11 may be connected to a conductive ring 13 which is attached to and extends around anode 1. If desired, bars 11 and other parts of the tube structure may be made hollow to permit the circulation of cooling water therethrough, but since the manner of providing such cooling facilities is obvious and forms no part of the present invention, it is neither shown nor described in detail.

Anode cylinder 1 is provided with a plurality of radial holes 14 in alinement with each of the bars 11. Coaxial with and within the hollow anode cylinder, and spaced along its length, there are a plurality of conductive (e.g., copper) rings 15. As shown, each of the rings 15 has two annular grooves extending around its outside circumference, thus forming three annular ridges extending radially outward from each of the rings 15. The center one of these three ridges is radially larger than the two outer ridges, so that the center ridge of each ring is in mechanical and electrical contact with cylinder 1, whereas the two outer ridges of each ring 15 are slightly separated from the anode cylinder.

Bars 11 are connected to rings 15 through a plurality of electrical conductors 16 (e.g. copper rods) which extend radially through the holes 14 in cylinder 1. Alternate ones of bars 11 are connected to the upper one of the two outer ridges of each ring 15, while the other alternate ones of bars 11 are connected to the lower one of the two outer ridges of each ring 15. Thus, each conductor 16, together with a portion of the conductive ring 15 to which it is attached, forms a coupling loop for transmitting electromagnetic energy from bars 11 to the interior of anode cylinder 1. With this construction, a large number of coupling loops are provided between the slow-wave structure and the hollow interior of the anode and thereby a very tight coupling is attained.

A conductive body 17 extends through and coaxial with hollow cylinder 1, as shown. By way of example, this may simply be a conductive, metal rod, as illustrated in Figs. 1 and 2. Rod 17, together with cylinder 1, forms a coaxial resonator or "tank" circuit for the electromagnetic wave energy transmitted thereto through the coupling loops from bars 11.

Fig. 3 is a greatly simplified, fragmentary, schematic of the same magnetron not drawn to true scale, illustrating certain principles of operation of the magnetron shown in more detail in Figs. 1 and 2. For simplification, all of the slow-wave structure has been omitted from Fig. 3, and the entire anode structure is represented by a simple cylinder 1.

The magnet structure provides a magnetic field between circular poles 9 and 10. A few typical magnetic flux lines are represented by broken lines in Fig. 3. Those of most interest are the flux lines 18, which pass in a lengthwise direction through the cylindrical space between anode 1 and cathode 2. The electric field between the anode and cathode is essentially radial. It will be noted that the flux lines 18 are substantially perpendicular to the electric field, at least throughout a major portion of the region between poles 9 and 10, and that, near their ends, the same flux lines turn gently outward and pass through cathode 2 at a low grazing angle. Thus, there is a very gradual transition in the electric and magnetic field configurations between the central portion of the structure illustrated and the magnetic poles 9 and 10. This gradual transition, without any abrupt discontinuity, is of great importance in making possible operation at exceptionally high power levels and gas pressures without breakdown and arcing. A relatively "bad vacuum," in comparison to the very high vacua usually sought in vacuum tubes, has a desirable effect in the present magnetron because of the increased supply of electrons provided by gas amplification resulting from ionizing collisions between electrons and gas molecules.

In the field configuration that has been described, there are two principal components of electron trajectories: a spiral path of the type represented by line 19, closely following and encircling a magnetic flux line; and a cycloidal or magnetron path, of the type represented by line 20, circling generally around the inner electrode. Momentum changes, associated with collisions with gas molecules and the like, can cause an electron to change the amount of spiral component. The spiral component alone cannot occur in crossed fields. In the middle portion, where the E and B fields are crossed, all electrons have the cycloidal component equally strong, and their spiral component may or may not exist, or be changed by collisions with gas atoms or by collisions with "intensity fluctuations" of electric field "noises."

The spiral trajectory, represented by line 19, is similar to the type of electron trajectory encountered in a Philips ion gauge (sometimes called Philips vacuum gauge or a Penning ion gauge); and it is well known that an electron following a trajectory of this type can travel very long distances in comparison to the dimensions of the electrode structure, and therefore has a relatively large probability of experiencing ionizing collisions with gas molecules, even in a fairly high vacuum. It is for this reason that the Philips ion gauge supports a type of glow discharge in highly evacuated regions, at absolute pressures such that a glow discharge could not otherwise be supported within a structure of comparable dimension.

The cycloidal motion is negligibly small in Philips ion gauge, although it is not absent. Suitably crossed fields can give cycloidal paths that may be as many miles long as the sequence of spirals of a Philips gauge. Fig. 3 has this type of curvature and crossing of fields to produce very long cycloidal paths, with or without axial spiral component.

In this way the glow discharge, involving electrons in trajectories of the cycloidal type with perhaps a component of the Philips ion gauge type, acts as a starter for providing an initial and continuing supply of electrons. Fluctuations in this cloud drive some electrons into the cathode hard enough to release even more secondaries.

To start the glow without delay when high voltage is applied, a radioactive source of charged particles can be built into the wall of the region. Otherwise it may be desirable to have a steady glow of very low intensity at all times in order to be ready immediately when the high power voltage is applied.

Once a sufficient supply of magnetron-type, orbiting electrons has been established, the fluctuations will grow, and operation may proceed as in conventional magnetrons, with interactions between the orbiting electrons and electromagnetic waves supported by the slow-wave structure comprising the bars 11 illustrated in Figs. 1 and 2. In these interactions, certain of the electrons transfer energy to the electromagnetic field for building up and sustaining the oscillations, and for supplying the output power delivered by the tube. Other orbiting electrons are accelerated back to the cathode, and upon bombarding the cathode release secondary electrons which augment and increase the electronic current flowing around the cylindrical space between the anode and cathode. This emission of secondary electrons is the well-known back-bombardment effect of cold-cathode magnetron operation, which would require no further description, except that it also occurs in the absence of slow-wave structures. The high frequency electric field of plasma oscillation noise voltages suffices to produce back-bombardment and secondary electrons that outnumber those electrons produced by collisions with gas atoms, after a sufficient electron concentration has been built up by gas collisions to start the plasma oscillations. The total electron cloud from all these causes must build up to a certain rather large value before the slow-wave structure and coupled load can participate and predominate with voltage of a single frequency.

A hot filament could supply the initial charge of circulating electrons which becomes unstable and develops plasma oscillations of intensity sufficient to send some electrons against the cathode with energy sufficient to release even more secondary electrons as in a previously-known type of cold-cathode magnetron. This is of limited usefulness however, because a cathode bombarded only by electrons soon loses the surface condition needed for copious secondary electron emission. Simultaneous bombardment by suitable ions improves or maintains the secondary emission ability of the surface and provides ample initial electrons from gas-collisions, faster and cheaper than a filament.

A filament or radioactive source could be useful with low gas pressure chosen to allow higher voltage operation however, to decrease the few microseconds delay in the start of the gaseous production of the main body of the initial cycloidal beam of electrons. Such an initial beam must be formed before plasma oscillations and secondary emission can build up the very great current needed before the slow-wave-structure voltages cause the final highest currents to flow. Thus the four-stage build-up provides in the order named: initial electrons, gas glow, plasma oscillation secondaries, and slow-wave secondaries.

For efficient operation, the electrons traveling in cycloidal paths must be kept in the useful region near the center of the cylindrical space between the electrodes, and must be prevented from migrating in great numbers out the ends of the electrode structure. With the structure herein illustrated and described, this is accomplished by the gentle curvature of the magnetic field into the cathode near the magnetic poles 9 and 10. As a result of this curvature, those of the cycloidally orbiting electrons that approach the poles 9 and 10 are urged back toward the central portion of the cylindrical space, where they will interact usefully with the electromagnetic fields associated with the slow-wave structure comprising bars 11. Additionally, a sufficiency of such electrons are prevented from remaining long enough to produce collisions in regions that lack magnetic protection from arc-formation, and are thus prevented from initiating breakdown or arcing between the electrodes 1 and 2.

A distinctive feature and great advantage of the present magnetron over conventional magnetrons is its great resistance to the formation of arcs between the electrodes, which in turn permits it to operate at exceptionally high power levels and gas pressures. In general, the formation of arcs is inhibited by so arranging and shaping the electrode and magnet structures that ions and electrons, traveling in opposite directions, cannot follow substantially identical paths, between the two electrodes, neither in the active discharge region nor in that fringing part of the fields near the active discharge, where the charged particle density is high enough momentarily to bombard either electrode hard enough to increase the gas density significantly.

For example, consider the case of an electron emitted from cathode 2 and following a cycloidal path 20 near the center of the cylindrical space between the electrodes. This is the active discharge region, where most of the electrons will be found. As the electron follows its cycloidal path, traveling around the anode 1, its average energy remains substantially constant until it changes momentum by collision with a gas molecule, or by exchanging energy with a changing electromagnetic field. After a sufficiency of such encounters, the cycloidal path may be displaced so close to the anode that another encounter will permit the electron to strike anode 1. Upon striking the anode in great enough concentration to liberate more gas which may become ionized and strike the cathode, more electrons will be released to also strike the anode. However, the nature of the trajectories of charged particles in crossed electric and magnetic fields makes it extremely unlikely that any substantial portion of the ions so produced will return to the same part of the cathode that liberated the initial random fluctuation of electron ejection and consequently the formation of an arc is most improbable. Thus, the magnetic field inhibits the formation of an arc, just as it does in the central discharge region of a conventional magnetron.

Now consider the case of an electron which, in its travels, wanders out past the ends of the active discharge region. In a conventional magnetron, these are the electrons that are most likely to cause breakdown and arcing if gas or gassy surfaces exist. Upon passing out of the protected region in a conventional magnetron, such electrons may enter regions where the electric and magnetic fields are approximately parallel, whereby electrons and ions can follow substantially identical paths between the positive and negative electrodes. Furthermore, in a conventional magnetron the number of electrons available to start on such paths may be enough to release vapor from surfaces and initiate arcs.

In the present magnetron, this difficulty is avoided by making the transition in the electric and magnetic field configurations very gradual. In other words, any electrons that tend to wander from the central discharge region, toward the magnetic poles 9 and 10 will soon begin to experience a force urging them back toward the active discharge region. This can occur while the electrons are still at a considerable distance from the magnetic poles, and where the magnetic field is still substantially perpendicular to the electric field and thereby provides strong protection against arc-formation.

Immediately adjacent to the magnetic poles, the magnetic field is radial and therefore substantially parallel to the electric field, but this region is protected from arc-formation by two factors: first its relatively great distance from the region of active discharge, and the long, gradual transition in field configurations, which diminishes the gaseous electron multiplication factor and hence the ion and electron density is very small even before reaching the region of parallel fields immediately adjacent to the magnetic poles; and second, the spacing of the electrodes and the relatively short path between anode and cathode in this region, make it unlikely that any electron passing directly from the cathode to the anode in the region of the magnetic poles will ionize a troublesome amount of the regular relatively high density of gas molecules during its quick, short passage across the interelectrode space.

Where the fields would not prevent arc-formation, the electrodes are not bombarded with intensity sufficient to raise the gas density even momentarily to a value that could allow an arc to develop.

Again referring to Figs. 1 and 2, a distinctive feature of the magnetron there illustrated is that the load is a resonant circuit within the hollow cylindrical anode. In general it is somewhat difficult to transfer energy into a high Q resonant load circuit from another low Q resonant circuit, such as the slow-wave structure of the magnetron. In the present magnetron, this difficulty is overcome by the novel means illustrated and described for coupling the two circuits together so closely that they must oscillate as parts of a single circuit and all parts are in phase with each other, and therefore in proper phase relation for efficient power transfer. The close coupling is achieved by providing a large number of coupling loops between the slow-wave structure, comprising bars 11, and the resonant load circuit inside the hollow anode. The rings 15 and copper rods 16, hereinbefore described, provide this large number of coupling loops. As illustrated, there are five coupling loops connected to each of the bars 11 of the slow-wave structure and eighteen bars—a total of ninety coupling loops. In actual practice, an even larger number of coupling loops may be provided, if desired, by increasing the number of rings 15, or the number of bars 11, or both.

If the primary resonant circuit (bars) has a Q much greater than that of the load, the power tranfer is easy, especially if the load is a pure resistance or other matched load.

The bars become portions of the single large tank circuit at the desired frequency, and a suitable portion of the total tank voltage appears on the bars for interaction with cycloidal electrons. The bars also can develop suitable voltage for interaction, independent of the tank circuit, but only at frequencies so remote that cycloidal velocities can be adjusted to prevent buildup of oscillations in that manner.

In the Figure 1 tube the primary bar's Q is not great enough to store the energy needed for efficient oscillation and harmonic suppression ($Q \gtrless 10$ would be needed). Therefore the central resonant tank is added with a Q of 10 or more, and the primary bar resonance must be eliminated by tuning it to much higher frequency.

The radio-frequency power, which is generated by the magnetron oscillator described and is transferred to the resonant circuit inside of hollow anode 1, may be used for any desired purpose. If desired, it can be removed from the resonant circuit by any appropriate coupling means, and supplied to any desired utilization device, such as an antenna. However, a particular purpose contemplated by this invention, for generating radio-frequencies power at such high power levels, is to use the generated power for heating various bodies to extremely high temperatures, and the present magnetron oscillator is particularly well adapted for this purpose. For example, the body which is to be heated may be a conductive body that extends through and along the axis of the hollow anode. This may be a metal rod 17, or may be a hot, ionized plasma of excited gas, formed, for example, by magnetically pinching a gas discharge, and heated to very high temperature by the radio-frequency energy generated by the magnetron. Such a plasma may be used for any desired purpose, including but not limited to experiments and observations dealing with characteristics of materials at high temperatures.

With particular reference to Fig. 4, a magnetron has been illustrated in greatly simplified and schematic form. It will be understood that the cylinder 1 represents the cylindrical anode structure illustrated in Fig. 1, that the cylinder 2 represents the cylindrical cathode, and that other structures necessary for magnetron operation, and for coupling the electromagnetic wave energy into the interior of hollow anode 1, may be provided in the manner hereinbefore described. A conductive body of plasma 17' within an insulating tube 17" extends axially through the hollow anode, is electrically connected at one end to conductive disc 12 of the anode structure. and is electrically connected at the other end to a conductive disc 21, which may be separated from the anode structure by a tubular insulator 22. Connections to an electrical supply 23 may be provided, as shown, for supplying electric current through gas discharge 17' with strength of surrounding magnetic field sufficient to pinch the plasma to a small diameter. The magnetic field of the magnetron can be part of the stabilizing field required to sustain the slender pinch near the axis.

Operation is started by closing switch 24. The current passing through the discharge within tube 17" pinches it to a slender conducting core 17', to form the central conductor of the coaxial tank circuit of the magnetron. Operation of the magnetron generates R-F energy for heating the pinched gas. The plasma may be confined for a time by magnetic means known to those skilled in the art, including the stabilized pinch effect of an axial magnetic field, combined with the field of the pinch current flowing through the plasma supplied by supply 23. The electromagnetic energy generated by the magnetron oscillator can heat this plasma to tremendously high temperatures especially if the confining magnetic field and the substantially radial electric field of the radio frequency satisfy cyclotron conditions. The so-heated plasma can be observed, for determining the effects of high temperatures upon materials, or used for any other desired purpose.

Figure 5:
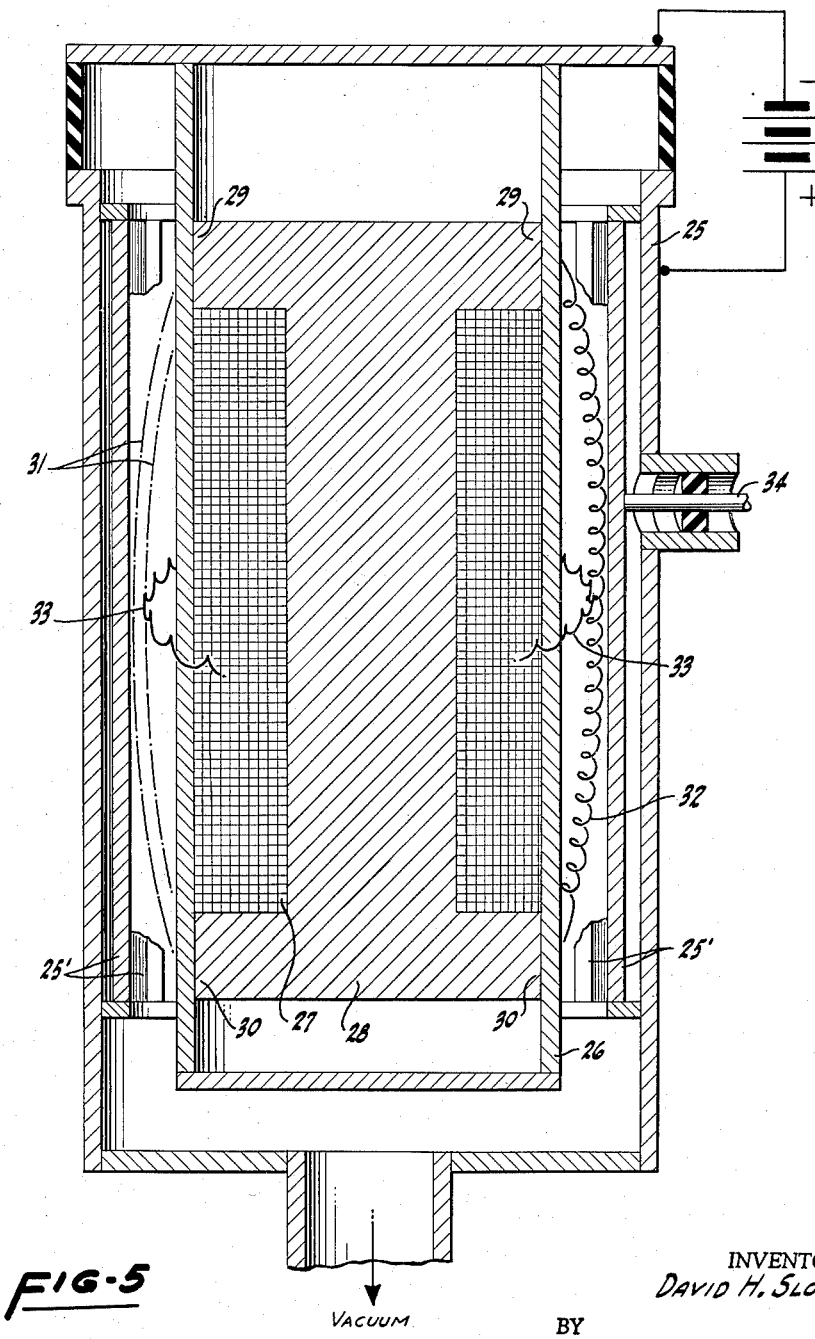
Fig. 5 is a simplified, schematic, lengthwise section showing another modification, with the cathode inside the anode.

Fig. 5 is a simplified, largely schematic representation of a modification, wherein the cathode is within the anode, and the magnet is within the cathode. In Fig. 5, a cylindrical anode is represented at 25, and a cylindrical cathode, coaxial with and within the cylindrical anode, is represented at 26. For simplification, the slow-wave structure of the magnetron is illustrated in a somewhat fragmentary, largely schematic manner. It will be understood that various types of magnetron slow-wave structures may be provided; that illustrated comprises a plurality of parallel bars 25' arranged in a cylindrical configuration coaxial with and within anode cylinder 25.

The magnetron magnet structure comprises a cylindrical magnet winding 27, disposed coaxial with and within the hollow cylindrical cathode 26. A spool-shaped magnet core 28 extends through winding 27, as shown, and provides two, circular magnetic poles 29 and 30, extending around the inside of, and adjacent to, the cylindrical cathode 26. Typical lines of magnetic flux are represented by broken lines 31. It is evident that the electric field between the anode and the cathode is substantially radial, and that the flux lines 31 are substantially parallel to the electric field throughout the central portion of the cylindrical space between the two electrodes. Near the magnetic poles the magnetic flux lines curve gently toward the poles, and pass through the more negative electrode, or cathode, at a low, grazing angle. It is evident that a similar flux pattern could be provided by a magnetic circuit comprising the same, circular poles within the hollow cathode, a magnet yoke extending outside the electrode structure, and a winding external to the electrode structure.

As in the previously described embodiment, there are two principal components of the electron trajectories: in one component, represented by line 32, electrons spiral around magnetic flux lines; and in the other component represented by line 33, electrons move in cycloidal or magnetron paths around the inner electrode.

It is evident that the structure shown in Fig. 1 and the structure shown in Fig. 5 are inside-out analogs of each other. In conventional magnetrons, the cathode is usually inside the anode, and therefore the structure shown in Fig. 5 is more like that of a conventional magnetron, whereas the structure shown in Fig. 1 is an "inside-out" magnetron. The inside-out structure shown in Fig. 1 makes it easier to provide a large, powerful electromagnet, which is desired; and cooling of the cathode and magnet structures, where required, is facilitated. Where the load is to be incoroprated inside the magnetron structure, as herein described in connection with Figs. 1 and 2, the inside-out construction has further advantages. This greatly improves the separation of frequencies of undesired modes of operation. The mode patterns of the inside-out model of Fig. 1 are so favorable that it should be most useful to increase the diameter by a factor of ten or more and use the broad short anode tank resonant cavity thus formed, instead of the coaxial form of tank of Fig. 1. This clearly would increase the power tenfold. Needless to say, such a large cathode would not be practical if it required a red-hot thermionic surface, but is quite feasible if the cathode is a large, watercooled cylinder of aluminum or magnesium. Such a modification is illustrated in Fig. 6.

The embodiment illustrated in Fig. 5 operates in a manner analogous to the operation of the embodiment described in connection with Fig. 1. Electrons moving in cycloidal orbits, such as the orbit represented by line 33, interact with electromagnetic waves transmitted on the slow-wave structure comprising bars 25'. Such interactions supply energy to the electromagnetic waves for building up and sustaining oscillations and for supplying output radio-frequency power. Any appropriate coupling means can be employed for transmitting power from the slow-wave structure to any desired load or utilization circuit. In the drawing, such coupling means is schematically represented by the coaxial connection 34.

Fig. 6 illustrates a form of the invention in which an "inside-out" magnetron with a large-diameter, relatively short anode is used to heat a conductive plasma that is magnetically confined by the pinch effect. An annular plasma 35 is enclosed within a substantially toroidal, high-resistance conductive tube or envelope 36. If desired, an insulating lining may be provided within tube 36, and suitably insulated breaks or discontinuities may be provided in the conductive tube for easy application of the voltage which produces the pinch effect. These discontinuities can be located at the region of R-F maxima of the voltage standing waves in the coaxial line which employs the pinch as its central conductor. A plurality of annular transformer cores 37, each provided with a primary winding 38, extend around tube 36, as shown. Thus, tube 36 and the plasma therein form a shorted, single-turn secondary wrapped around a composite transformer core of great cross-sectional area. By such means, thousands of volts can be induced in the single-turn secondary. Correspondingly large currents flow through the secondary, and the plasma is confined to the center of tube 36 by the pinch effect of these large currents. A solenoid (not shown) may be wound around tube 36 to provide a stabilizing magnetic field parallel to the pinch axis.

The magnetron supplies additional power to heat the confined plasma, so that thermonuclear reactions may be initiated. The magnetron comprises a large-diameter, hollow cylindrical anode 39 concentric with and within a larger-diameter, hollow, cylindrical cathode 40. The magnetic field for operation of the magnetron is supplied by an electromagnet 41, which may be similar to the electromagnets hereinbefore described except for an increased diameter. The slow-wave structure of the magnetron includes a plurality of parallel bars 42, as in the preceding embodiments except that the relatively large diameter of the magnetron shown in Fig. 6 makes possible the use of a larger number of bars 42. The R-F power which the magnetron generates, is transmitted from bars 42 to the interior of the hollow anode by a coupling structure comprising a plurality of the grooved rings 43.

Within anode 39, a pair of convex-inward end plates 44 and 45 define therebetween a cavity which acts as a radial transmission line between the coupling loops 43 and the tube 36 containing plasma 35. The convex-inward shape of the end plates improves the mode separation within the "radial-line" cavity. Preferably, for best heating of the plasma, the radial length of the "radial-line" cavity is made equal to one-half wavelength of the electromagnetic waves transmitted thereby, and the radio frequency of the magnetron is adjusted to give cyclotron action in the magnetic field of the current in the single-turn secondary. With respect to this cyclotron action, the effective electric field is that of the coaxial line formed by the annular plasma 35 and its surrounding conductor 36, with standing waves formed in this coaxial system.

It should be understood that this invention in its broader aspects is not limited to specific embodiments herein illustrated and described. The scope of the invention is defined by the following claims, which are intended to cover all changes and modifications embodying inventive principles herein disclosed.

What is claimed is:

1. A magnetron comprising an anode and a cathode concentrically arranged, one within the other, defining therebetween a ring-shaped interelectrode space, said cathode comprising a cylindrical wall having one side adjoining the interelectrode space and facing toward said anode and having an opposite side facing away from said anode, and a magnet having a pair of circular pole faces concentric with and spaced longitudinally on said cylindrical wall, said pole faces being adjacent to and facing said opposite side, whereby magnetic flux passes from one magnetic pole face through said wall into the interelectrode space and back through said wall to the other pole face, said flux passing through said wall at a low, grazing angle.

2. A magnetron comprising a cylindrical cathode, an anode concentric with and within said cathode, defining therebetween a ring-shaped interelectrode space, said cathode comprising a non-magnetic, cylindrical wall having an inner side adjoining the interelectrode space and facing toward the anode and having an opposite, outer side facing away from said anode, an electromagnet winding concentric with and outside of said cathode, and a ferromagnetic shell extending concentrically around said winding, said shell comprising two annular flanges extending inwardly over the ends of said windings, said flanges having circular inner edges adjoining the outer side of said cylindrical wall and forming two circular pole faces concentric with and spaced longitudinally on said cylindrical wall, said pole faces being adjacent to and facing said outer side, whereby magnetic flux passes from one magnetic pole face through said wall to the interelectrode space and back through said wall to the other pole face, said flux passing through said wall at a low, grazing angle.

3. A magnetron comprising a hollow anode, a cylindrical cathode concentric with and within said anode, defining therebetween a ring-shaped interelectrode space, said cathode comprising a non-magnetic, cylindrical wall and having an outer side adjoining the interelectrode space and facing toward the anode and having an opposite, inner side facing away from said anode, an electromagnet winding concentric with and within said cathode, and a spool-shaped ferromagnetic core extending longitudinally through said winding, said core comprising two flanges extending outwardly over the ends of said winding, said flanges having circular outer edges adjoining the inner side of said cylindrical wall and forming two circular pole faces concentric with and spaced longitudinally within said cylindrical wall, said pole faces being adjacent to and facing said inner side, whereby magnetic flux passes from one magnetic pole face through said wall into the interelectrode space and back through said wall to the other pole face, said flux passing through said wall at a low, grazing angle.

4. A magnetron comprising a cylindrical cathode, a hollow anode concentric with and within said cathode, defining therebetween a ring-shaped interelectrode space, said anode comprising a plurality of uniformly spaced, parallel, electrically conductive bars arranged in a cylindrical array concentric with said cathode and adjoining the interelectrode space, a plurality of electrically conductive rings concentric with and within said cylindrical array, said rings being spaced along the length of said array, electrical connections joining alternate ones of said bars to one end of each ring, other electrical connections joining the other alternate ones of said bars to the other end of each ring, whereby said rings and connections form a plurality of coupling loops for the effective transfer of electromagnetic wave energy from said bars to the interior of said hollow anode, said cathode comprising a non-magnetic, cylindrical wall having an inner side adjoining the interelectrode space and facing toward the anode and having an opposite, outer side facing away from said anode, an electromagnet winding concentric with and outside of said cathode, and a ferromagnetic shell extending concentrically around said winding, said shell comprising two annular flanges extending inwardly over the ends of said winding, said flanges having circular inner edges adjoining the outer side of said cylindrical wall and forming two circular pole faces concentric with and spaced longitudinally on said cylindrical wall, said pole faces being adjacent to and facing said outer side, whereby magnetic flux passes from one magnetic pole face through said wall to the interelectrode space and back through said wall to the other pole face, said flux passing through said wall at a low, grazing angle.

5. A magnetron comprising a cylindrical cathode, a hollow anode concentric with and within said cathode, defining therebetween a ring-shaped interelectrode space, said anode comprising a plurality of uniformly spaced, parallel, electrically conductive bars arranged in a cylindrical array concentric with said cathode and adjoining the interelectrode space, a plurality of electrically conductive rings concentric with and within said cylindrical array, said rings being spaced along the length of said array, electrical connections joining alternate ones of said bars to one end of each ring, other electrical connections joining the other alternate ones of said bars to the other end of each ring, whereby said rings and connections form a plurality of coupling loops for the effective transfer of electromagnetic wave energy from said bars to the interior of said hollow anode, and a magnet providing a longitudinal magnetic field within the ring-shaped interelectrode space.

6. A magnetron comprising a cylindrical cathode, a hollow anode concentric with and within said cathode, defining therebetween a ring-shaped interelectrode space, said anode comprising a plurality of uniformly spaced, parallel, electrically conductive bars arranged in a cylindrical array concentric with said cathode and adjoining the interelectrode space, a plurality of electrically conductive rings concentric with and within said cylindrical array, said rings being spaced along the length of said array, electrical connections joining alternate ones of said bars to one end of each ring, other electrical connections joining the other alternate ones of said bars to the other end of each ring, whereby said rings and connections form a plurality of coupling loops for the effective transfer of electromagnetic wave energy from said bars to the interior of said hollow anode, and a pair of end plates covering the ends of said hollow anode, defining therebetween a microwave cavity within the anode, said anode having an inside radius approximately equal to one-half wavelength at the operating frequency of the magnetron, the spacing between said end plates being less than one-half wavelength.

7. A magnetron as in claim 6, said end plates having a convex-inward shape whereby the space between said plates is greatest at their outer edges and decreases toward their centers.

8. A magnetron comprising a cylindrical cathode, a hollow anode concentric with and within said cathode, defining therebetween a ring-shaped interelectrode space, said anode comprising a plurality of uniformly spaced, parallel, electrically conductive bars arranged in a cylindrical array concentric with said cathode and adjoining the interelectrode space, a plurality of electrically conductive rings concentric with and within said cylindrical array, said rings being spaced along the length of said array, electrical connections joining alternate ones of said bars to one end of each ring, other electrical connections joining the other alternate ones of said bars to the other end of each ring, whereby said rings and connections form a plurality of coupling loops for the effective transfer of electromagnetic wave energy from said bars to the interior of said hollow anode, and means for establishing a plasma column coaxial with and within said hollow anode, whereby the electromagnetic wave energy heats said plasma to higher temperatures.

References Cited in the file of this patent

UNITED STATES PATENTS

| | | |
|---|---|---|
| 2,507,653 | Smith | May 16, 1950 |
| 2,609,522 | Hull | Sept. 2, 1952 |
| 2,819,423 | Clark | Jan. 7, 1958 |
| 2,826,708 | Foster | Mar. 11, 1958 |